United States Patent
Giusto et al.

(10) Patent No.: US 9,063,796 B2
(45) Date of Patent: Jun. 23, 2015

(54) METHOD AND APPARATUS FOR IMPROVING PROCESSING PERFORMANCE OF A MULTI-CORE PROCESSOR

(75) Inventors: Paolo Giusto, Antioch, CA (US); Karthik Lakshmanan, Pittsburgh, PA (US); Ragunathan Rajkumar, Monroeville, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 344 days.

(21) Appl. No.: 13/564,804

(22) Filed: Aug. 2, 2012

(65) Prior Publication Data

US 2014/0040904 A1 Feb. 6, 2014

(51) Int. Cl.
*G06F 9/46* (2006.01)
*G06F 9/52* (2006.01)
*G06F 9/48* (2006.01)

(52) U.S. Cl.
CPC .............. *G06F 9/526* (2013.01); *G06F 9/4881* (2013.01)

(58) Field of Classification Search
CPC ..... G06F 9/4881; G06F 9/526; G06F 9/4843; G06F 9/52; G06F 9/46
See application file for complete search history.

(56) References Cited

U.S. PATENT DOCUMENTS

| | | | |
|---|---|---|---|
| 5,727,209 A * | 3/1998 | Slingwine et al. | 718/102 |
| 6,782,440 B2 * | 8/2004 | Miller | 710/200 |
| 6,823,511 B1 * | 11/2004 | McKenney et al. | 718/102 |
| 7,007,270 B2 | 2/2006 | Martin et al. | |
| 7,058,948 B2 * | 6/2006 | Hoyle | 718/104 |
| 7,844,973 B1 * | 11/2010 | Dice | 718/108 |
| 7,861,042 B2 * | 12/2010 | Larson et al. | 711/152 |
| 8,799,591 B2 * | 8/2014 | Larson et al. | 711/152 |
| 2003/0041173 A1 * | 2/2003 | Hoyle | 709/248 |
| 2003/0115476 A1 * | 6/2003 | McKee | 713/193 |
| 2005/0050257 A1 * | 3/2005 | Shakula | 711/1 |
| 2005/0081204 A1 * | 4/2005 | Schopp | 718/100 |
| 2009/0007117 A1 | 1/2009 | Cho | |
| 2009/0158075 A1 | 6/2009 | Biberstein et al. | |
| 2009/0271141 A1 | 10/2009 | Coskun et al. | |
| 2009/0307707 A1 * | 12/2009 | Gellerich et al. | 718/107 |
| 2010/0268913 A1 | 10/2010 | Van Halder et al. | |
| 2011/0185216 A1 | 7/2011 | Zhao et al. | |

OTHER PUBLICATIONS

Singhal et al. "A Distributed Mutual Exclusion Algorithm for Mobile Computing Environments" 1997 IEEE, pp. 557-561.*
Keane et al. "A Simple Local-Spin Group Mutual Exclusion Algorithm" 2001 IEEE, pp. 673-685.*
Li et al. "Synthesis of Structurally Simple Supervisors Enforcing Generalized Mutual Exclusion Constraints in Petri Nets" 2010 IEEE, pp. 330-340.*
Furst, Simon, AUTOSAR Technical Overview, 2nd AUTOSAR Open Conference, May 13, 2010, Tokyo, Japan.
Moessinger, Juergen, AUTOSAR—The Standard for Global Cooperation in Automotive SW Development, ESEC 2008, May 14-16, 2008, Tokyo, Japan.
Schauer, Bryan, Multicore Processors—A Necessity; ProQuest Discovery Guides, Sep. 2008.

* cited by examiner

*Primary Examiner* — Van Nguyen

(57) ABSTRACT

Managing task execution in a multi-core processor may be achieved by employing a spinlock and a multi-processor priority ceiling protocol. The spinlock may be employed to effect a dynamically enforceable mutual exclusion constraint. The multi-processor priority ceiling protocol may be employed to effect the dynamically enforceable mutual exclusion constraint to synchronize a plurality of tasks executing in the first and second processing cores of the multi-core processor.

16 Claims, 5 Drawing Sheets

METHOD AND APPARATUS FOR IMPROVING PROCESSING PERFORMANCE OF A MULTI-CORE PROCESSOR

TECHNICAL FIELD

This disclosure is related to multi-core processors.

BACKGROUND

The statements in this section merely provide background information related to the present disclosure. Accordingly, such statements are not intended to constitute an admission of prior art.

Processors are electronic devices that are configured with central processing unit (CPU)(s) and associated memory and storage devices that execute routines to perform tasks. Performance of a processor may be improved by increasing clock speed of the CPU, thus resulting in faster execution of routines. There is an upper bound on clock speed and associated processor performance due to mechanical, electrical and thermal limitations of the processor hardware and interface devices.

Multi-core processors have been introduced to improve performance in executing routines to perform tasks. In such architectures, the presence of multiple processing cores enables the capability of true parallel task execution. However, tasks simultaneously executing on different cores may need to synchronize and/or coordinate with one another because of application-level requirements.

SUMMARY

A method for managing task execution in a multi-core processor includes employing a spinlock to effect a dynamically enforceable mutual exclusion constraint and employing a multi-processor priority ceiling protocol to effect the dynamically enforceable mutual exclusion constraint to synchronize a plurality of tasks executing in the first and second processing cores of the multi-core processor.

BRIEF DESCRIPTION OF THE DRAWINGS

One or more embodiments will now be described, by way of example, with reference to the accompanying drawings, in which:

FIG. 2-1 schematically shows a task execution diagram for executing a plurality of tasks in a multi-core processing system, in accordance with the disclosure;

FIG. 2-2 graphically shows a first timing graph associated with task execution in relationship to elapsed timesteps, in accordance with the disclosure;

FIG. 2-3 graphically shows a second timing graph associated with task execution employing a static offset shown in relationship to elapsed timesteps, in accordance with the disclosure;

FIG. 3 graphically shows a sensitivity evaluation of set/wait events for a baseline utilization and a maximum utilization plotted in relation to internal combustion engine speed, in accordance with the disclosure;

DETAILED DESCRIPTION

Figure 1:
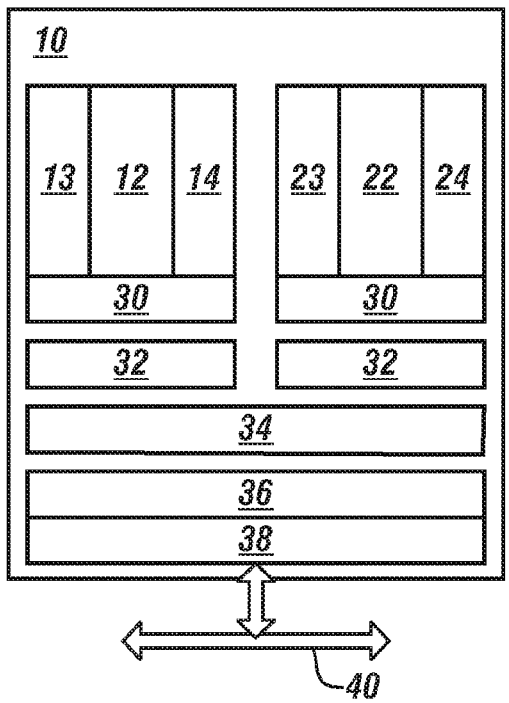
FIGS. 1-1 and 1-2 schematically show embodiments of exemplary multi-core processing systems that include first and second processing cores, in accordance with the disclosure.
Figures 1, 2:
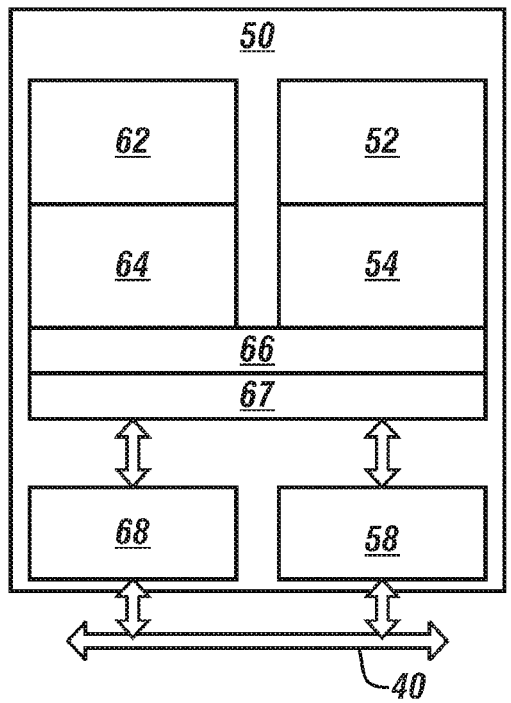

Referring now to the drawings, wherein the showings are for the purpose of illustrating certain exemplary embodiments only and not for the purpose of limiting the same, FIGS. 1-1 and 1-2 schematically illustrate embodiments of multi-core processing systems that include first and second processing cores. The multi-core processing systems described herein including first and second processing cores are illustrative and not restrictive. Furthermore, the terms 'first' and 'second' are employed to identify and differentiate specific processing cores, but are not employed to indicate an order of precedence or preference. The multi-core processing system preferably is a homogeneous multi-core processor, although the disclosure is not so limited. The concepts described herein apply to any multi-core processing system that employs two or more processing cores.

FIG. 1-1 shows a first embodiment of a homogeneous multi-core processor 10, which is preferably a single chip element including first and second processing cores 12 and 22, respectively, first and second architecture states 13 and 23, respectively, and individual first and second on-chip L1 memory caches 14 and 24, respectively. Other features include thermal controllers 30, programmable interrupt controllers (APIC) 32, and power management logic 34. A second shared memory cache 36 and bus interface 38 are employed to communicate with an external bus 40.

FIG. 1-2 shows a second embodiment of a homogeneous multi-core processor 50, which is preferably a single chip element including first and second processing cores 52 and 62, respectively, and individual first and second on-chip L1 memory caches 54 and 64, respectively. Other features include a system request interface 66, a cross-bar switch 67, and first and second memory controllers 58 and 68, respectively, which are used to manage communications with external devices including communications via external bus 40 in one embodiment. The first and second embodiments of the homogeneous multi-core processor 10 and 50 are illustrative.

Each of a plurality of tasks Ti includes a sequence of runnables, wherein m(i) denotes the number of runnables belonging to task Ti. The individual runnables are denoted as $R_{i,1}$ through $R_{i,m(i)}$. The worst-case execution time of each runnable $R_{i,j}$ is assumed to be known and denoted as $C_{i,j}$. The cumulative worst-case execution time of task Ti is the sum of all constituent runnable execution times, which is denoted as $C_i$ (i.e., $C_i = C_{i,1} + C_{i,2} + \ldots + C_{i,m(i)}$. The term P(Ti) denotes the processing core to which task Ti is assigned. The first runnable $R_{i,1}$ of any task Ti is assumed to be either triggered periodically every Ti or by an event $E_{i,1}$ set by another task with period Ti. All subsequent runnables $R_{i,j}$(j>1) are assumed to be triggered by either the completion of the previous runnable $R_{i,j-1}$ or an external event $E_{i,j}$. Each runnable $R_{i,j}$ is also given an offset $O_{i,j}>0$ such that the runnable is eligible to execute only after $O_{i,j}$ time units have elapsed since the corresponding release of $R_{i,1}$.

The runnable that triggers or sets an event $E_{i,j}$ is denoted by $\pi_{i,j}$. In the scenario that a runnable $R_{i,j}$ (j>1) is triggered by the previous runnable $R_{i,j-1}$ then $E_{i,j}$ is set by $\pi_{i,j}=R_{i,j-1}$. For convenience, $\pi_{i,j}=O$ for any runnable $R_{i,1}$ that is assumed to be triggered periodically every Ti. Each task has a deadline equal to its period Ti. This assumption follows from the fact that another iteration of task Ti will start if Ti does not complete in Ti time units. The priority assignment is assumed to follow rate-monotonic scheduling. Tasks with shorter periods are assigned higher scheduling priorities. Without loss of generality, the task set is given in non-decreasing order of periods and increasing order of priorities. The term hp(Ti) is employed to denote the set of tasks with higher priority than Ti, and lp(Ti) is employed to denote the set of tasks with lower priority than Ti. The term p(Ti) is employed to denote the priority of task Ti. For any lock M protecting a mutually exclusive shared resource, the term I(M) is employed to denote the number of tasks that access lock M, and $C_M$ is employed to represent the maximum duration for which M can be held.

Synchronization structures such as precedence constraints may be realized using events for multi-core precedence constraints. By way of example, two tasks are considered, including task T1 executing on processing core P1 and task T2 executing on processing core P2. The application requires a runnable $R_{2,d}$ of task T2 to start execution after the completion of a runnable $R_{1,s}$ of task T1. In this scenario, runnable $R_{2,d}$ on P2 can be made to Pend/Wait on an event $E_{2,d}$, which can in turn be set by the completion of runnable $R_{1,s}$ on P1. Set/wait events are employed to statically enforce mutual exclusion constraints by enforcing precedence relationships between runnables in different tasks running on the same core, and are generalized to the context of multi-core processors.

Analysis of tasks with set/wait events includes developing a response-time analysis for such tasks. By way of example, a task T1 on processing core P with runnables $R_{i,1}$ through $R_{i,m(i)}$ that uses set/wait events is evaluated. In one scenario none of the higher priority tasks Th (i.e., higher priority than Ti) on P use set/wait events to synchronize with other tasks, i.e., $\forall Th \in hp(Ti)$ and $\forall k>1$, $\pi_{h,k}=R_{h,k-1}$. In this scenario, a bound on the worst-case response time of task Ti can be derived, as follows. Let $F(R_{i,j})$ denote an upper bound on the finish time of runnable $R_{i,j}$. In order to calculate $F(R_{i,j})$, the last runnable $R_{i,e}$ of Ti before $R_{i,j}$ is employed, which was triggered by an external event, i.e., e<j is the largest value such that e=1 or $\pi_{i,e} \neq R_{i,e}$. The time instant at which this external event is set can be denoted as $S_{i,e}$. If $W_{i,\{e \ldots j\}}$ denotes the worst-case response time of the Ti segment including runnables $R_{i,e}$ through $R_{i,j}$, then $F(R_{i,j})$ is determined as follows.

$$F(R_{i,j})=S_{i,e}+W_{i,\{e \ldots j\}} \quad [1]$$

The finish time of runnable $R_{i,j}$ is thus no more than $W_{i,\{e \ldots j\}}$ from the setting of event $E_{i,e}$ at $S_{i,e}$.

An upper bound on the worst-case response time $W_{i,\{e \ldots j\}}$ can be obtained under the assumption that none of the higher-priority tasks on processing core P use external set/wait events. The worst-case response time $W_{i,\{e \ldots j\}}$ is calculated by using the standard response-time test, which is the convergence of the following:

$$W_{i,\{e \ldots j\}}^{v+1} = \sum_{q=e}^{j} C_{i,q} + \sum_{\forall Th \in hp(Ti) \ \& \ P(Th)=P(Ti)} \left\lceil \frac{W_{i,\{e \ldots j\}}^{v}}{T_h} \right\rceil C_h \quad [2]$$

wherein $$W_{i,\{e \ldots j\}}^{0} = \sum_{q=e}^{j} C_{i,q}$$

Assuming that runnables set their corresponding events by the end of their execution, the result includes the following.

$$S_{i,e}=F(\pi_{i,e}) \quad [3]$$

Figures 1, 2:
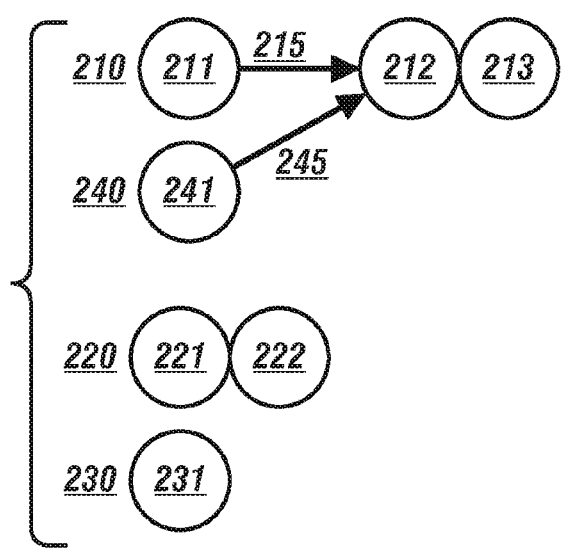
Figure 2:
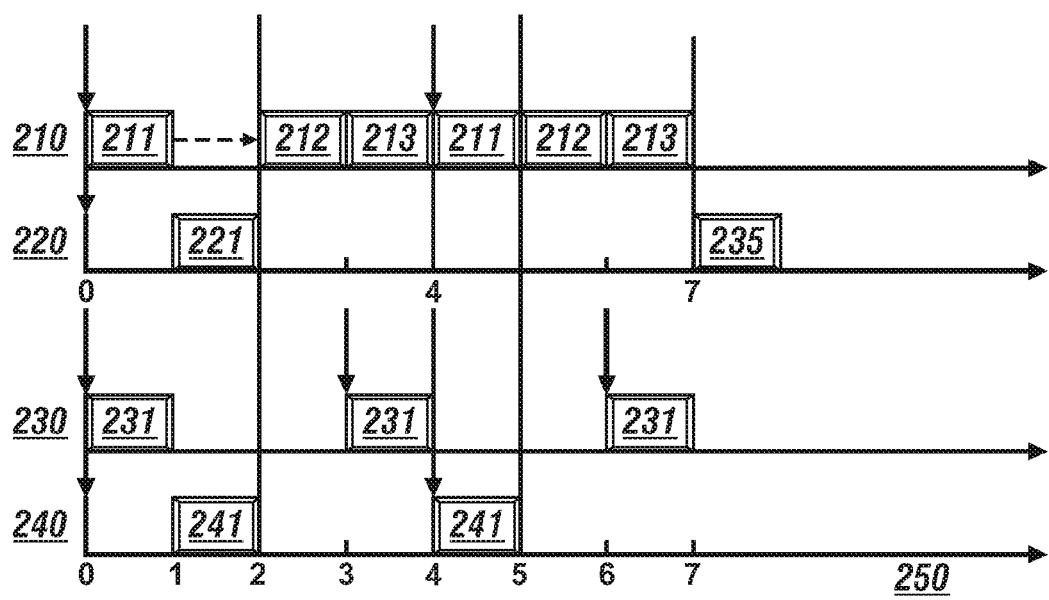
Figures 2, 3:
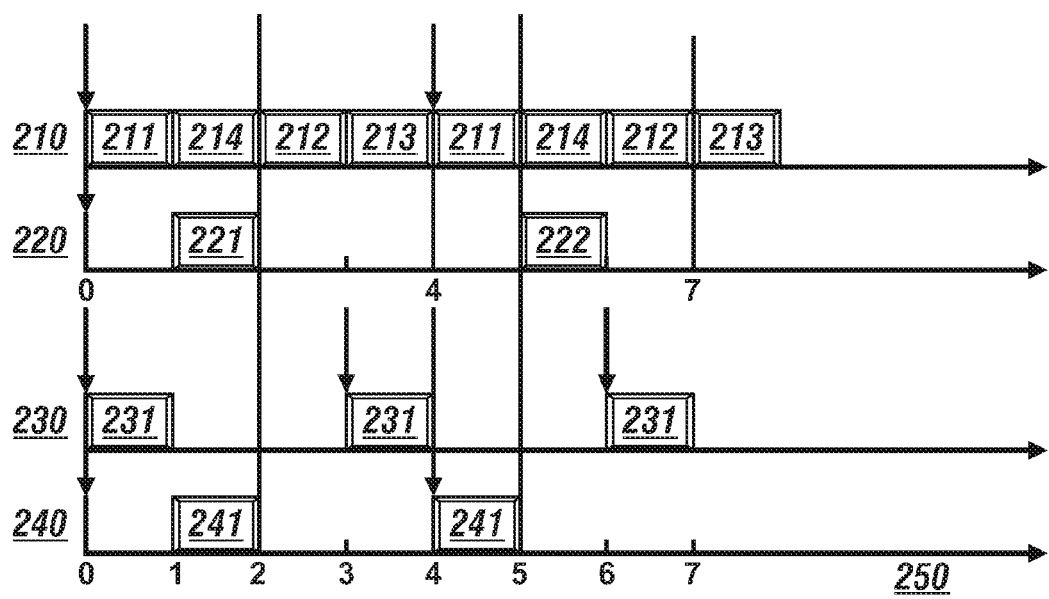
Figure 3:
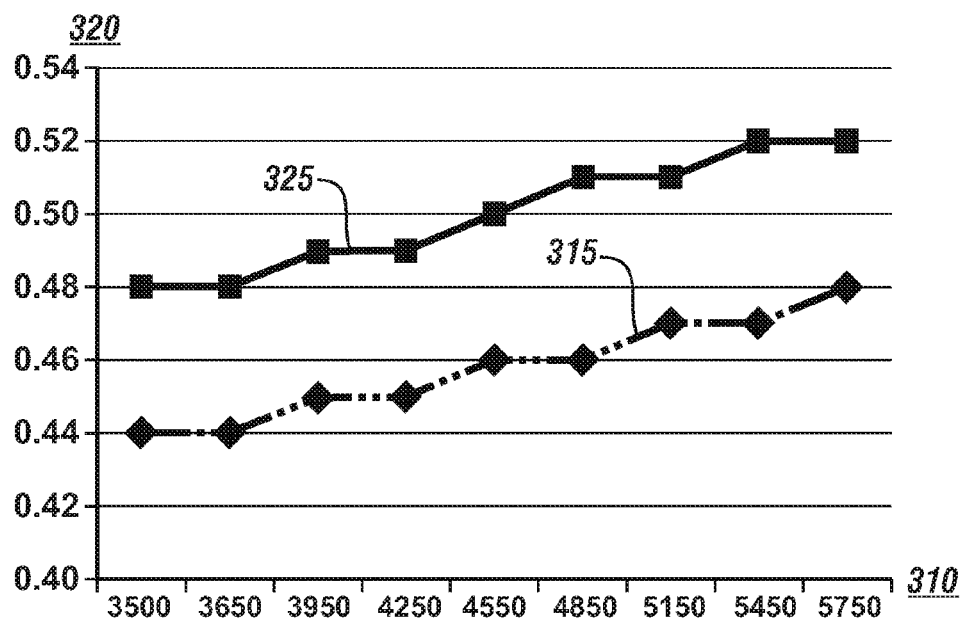

This operation is shown with reference to FIGS. 2-1, 2-2, and 2-3.

FIG. 2-1 schematically shows a task execution diagram for executing a plurality of tasks in a multi-core processing system, e.g., as described with reference to FIGS. 1-1 and 1-2. The executed tasks include T1 210, T2 220, T3 230, and T4 240. T1 210 includes sequentially executed runnables $R_{1,1}$ 211, $R_{1,2}$ 212, $R_{1,3}$ 213, and is executed by the first processing core. As shown, T1 210 is scheduled for execution once every four timesteps, and each runnable executes in a single timestep. T2 220 includes sequentially executed runnables $R_{2,1}$ 221 and $R_{2,2}$ 222, and is executed by the first processing core. As shown, T2 220 is scheduled for execution once every seven timesteps, and each runnable executes in a single timestep. T1 210 has a higher priority than T2 220, and thus will take precedence in execution in the first processing core. T3 230 includes a single runnable $R_{3,1}$ 231 and is executed by the second processing core. As shown, T3 230 is scheduled for execution once every three timesteps, and each runnable executes in a single timestep. T4 240 includes a single runnable $R_{4,1}$ 241 and is executed by the second processing core. As shown, T4 240 is scheduled for execution once every four timesteps, and each runnable executes in a single timestep. T3 230 has a higher priority than T4 240, and thus will take precedence in execution in the second processing core. The first and second processing cores 20 and 30 are each configured to execute one task runnable at a time. T2 220 and T3 230 are able to be executed without set/wait event constraints. T1 210 and T4 240 each have a set/wait event constraint, which is a precedence relationship wherein execution of runnable $R_{1,2}$ 212 cannot be initiated until complete execution of runnable $R_{1,1}$ 211 of T1 210 in the first processing core, as shown by connector 215 and runnable $R_{4,1}$ 241 of T4 240 in the second processing core, as shown by connector 245. Runnable $R_{4,1}$ is triggered by an event $E_{4,1}$ set by runnable $R_{2,3}$, i.e., $R_{4,1}=R_{2,3}$. Similarly, runnable $R_{2,4}$ is triggered by an event $E_{2,4}$ set by runnable $R_{4,1}$, i.e., $R_{2,4}=R_{4,1}$. As can be seen, the worst-case response time of each internally triggered contiguous segment is calculated to bound the overall task response time. The finish time $F(R_{2,3})$ of runnable $R_{2,3}$ is computed as the worst-case response time of the segment $R_{2,1}$ through $R_{2,3}$ using convergence described with reference to EQ. 2. This is then used as the setting time of event $E_{4,1}$ using EQ. 3. The worst-case response time of segment runnable $R_{4,1}$ is calculated using the convergence of EQ. 2. Again using EQS. 1 and 3, the finishing time of runnable $R_{4,1}$ is calculated as $F(R_{4,1})$. Using this finishing time value in EQ. 1 and the worst-case response time of segment $R_{2,4}$ through $R_{2,5}$ obtained using convergence of EQ. 2, the finishing time of runnable $R_{2,5}$ is obtained. This is also an upper bound on the worst-case response time of T2 220. Although the analysis provides an upper bound on the worst-case response time of tasks using set/wait events, the bounds can be pessimistic due to the assumption of independent worst-case response times for each contiguous segment of internally-triggered runnables. Also, the set/wait events structures often lead to larger worst-case response times that are due to the potential for long delays in setting events. For instance, in the example shown in FIG. 2-1, wherein T2 220 has to account for the preemption of T4 by T2 230 since this leads to a delay in setting $E_{2,4}$. Thus, it may be beneficial both from analysis and performance perspectives to avoid set/wait event structures if possible to ensure the task set is schedulable at higher utilization thresholds or alternatively utilizing slower (and therefore) cheaper processors. A consequence of using set/wait events is that the release of runnables is no longer guaranteed to be periodic. Depending on the setting time $S_{i,e}$ of external events, the release time of runnable $R_{i,e}$ changes. This leads to jitter and scheduling penalties for lower-priority tasks. This can be avoided by statically assigning appropriate offsets to the runnables that are triggered by external events.

FIG. 2-2 graphically shows the first timing graph associated with execution of the tasks T1 210, T2 220, T3 230, and T4 240 that are described with reference to FIG. 2-1 in relationship to elapsed timesteps shown on the x-axis 250. No static offsets are employed. Executions of task runnables are shown starting at timestep 0. As the timesteps progress, runnables of T1 210, T2 220, T3 230, and T4 240 are executed. Tasks T1 210 and T2 220 are assigned to first processing core while tasks T3 230 and T4 240 are assigned to second processing core. T1 210 and T4 240 synchronize with each other using set/wait events. T1 210 is made up of runnables $R_{1,1}$, $R_{1,2}$, and $R_{1,3}$. T4 240 is made up of a single runnable $R_{4,1}$. T1 210 and T4 240 are triggered periodically every 4 time units. Runnable $R_{1,2}$ is eligible to execute after the completion of $R_{1,1}$ and it is triggered by an external event $E_{1,2}$ set by $R_{4,1}$, i.e., $T_{1,2}=R_{4,1}$. As for the other tasks, T2 220 has two runnables $R_{2,1}$ and $R_{2,2}$ with a period of 7 time units, and T2 230 has a single runnable $R_{3,1}$ with a period of 3 time units. For simplicity of presentation, all runnables are assumed to have a worst-case execution time of 1 time unit.

In the scenario shown in FIG. 2-2, the release jitter of runnable $R_{1,2}$ causes T2 220 to miss its deadline of 7 time units. It can be seen that $R_{1,2}$ was delayed on event $E_{1,2}$ during the first release of T1 210, while it was not delayed during the second release. This causes an increased preemption on T2 220, which leads to T2 220 missing its deadline.

A mechanism includes assigning release offsets in addition to the event triggers to address release jitter. By way of example, a runnable triggered by an external event $E_{i,e}$ is evaluated. The event $E_{i,e}$ is guaranteed to be set by the worst-case finish time $F(\pi_{i,e})$ of the runnable $\pi_{i,e}$ setting Ei,e. Therefore, assigning a static offset of $\Phi_{i,e}=F(\pi_{i,e})$ guarantees that the event $E_{i,e}$ is set before runnable $R_{i,e}$ starts executing. Static offsets thus act as a simple period enforcer, which allows for a periodic release of runnable $R_{i,e}$ and relieves tasks with lower priority than task Ti from dealing with the release jitter of runnable $R_{i,e}$. If runnables are not assigned such static offsets, it may lead to longer worst-case response times and unpredictable runnable release times during system operation.

Details of the operation depicted in FIG. 2-2 include as follows. At timestep 0, runnable $R_{1,1}$ 211 of T1 210 executes in the first processing core and runnable $R_{3,1}$ 231 of T2 230 coincidentally executes in the second processing core. At timestep 1, runnable $R_{2,1}$ 221 of T2 220 executes in the first processing core and runnable $R_{4,1}$ 241 of T4 240 executes in the second processing core. T1 210 is delayed in executing because runnable $R_{1,2}$ 212 of T1 210 is awaiting execution of runnable $R_{4,1}$ 241 of T4 240 in the second processing core, which is a required condition precedent for execution of runnable $R_{1,2}$ 212 of T1 210 which has lower priority than runnable $R_{3,1}$ 231 of T2 230. At timestep 2, runnable $R_{1,2}$ 212 of T1 210 executes in the first processing core after completed executions of the condition precedents of runnable $R_{1,1}$ 211 of T1 210 and runnable $R_{4,1}$ 241 of T4 240. At timestep 3, runnable $R_{3,1}$ 231 of T2 230 executes again in the second processing core in response to its scheduled execution that occurs every three timesteps. Element $R_{1,3}$ 213 of T1 210 executes in the first processing core, thus completing an iteration of T1 210. At timestep 4, another iteration of T1 210 executes in the first processing core in response to its scheduled execution that occurs every four timesteps. Thus, at timestep 4, runnable $R_{1,1}$ 211 of T1 210 executes. Simultaneously, runnable $R_{4,1}$ 241 of T4 240 executes in the second processing core because runnable $R_{3,1}$ 231 of T2 230 has previously executed and the second processing core is available to so execute.

The simultaneous execution of runnable $R_{1,1}$ 211 of T1 210 and runnable $R_{4,1}$ 241 of T4 240 allows execution of runnable $R_{1,2}$ 212 of T1 210 at timestep 5 followed by execution of runnable $R_{1,3}$ 213 of T1 210 at timestep 6. This action precludes execution of runnable $R_{2,2}$ 222 of T2 220 due to its lower priority in the first processing core. Thus, T2 220 fails to execute in its allotted time period, and a fault ensues, as indicated by element 235.

FIG. 2-3 graphically shows the second timing graph associated with execution of tasks T1 210, T2 220, T3 230, and T4 240 that are described with reference to FIG. 2-1 in relationship to elapsed timesteps shown on the x-axis 250 and employing static offset in T1 210. T1 210 is able to employ a static offset because it has three task runnables and four timesteps in which to complete its task. Executions of the task runnables are shown starting at timestep 0. As the timesteps progress, runnables of T1 210, T2 220, T3 230, and T4 240 execute as follows. At timestep 0, runnable $R_{1,1}$ 211 of T1 210 executes in the first processing core and runnable $R_{3,1}$ 231 of T2 230 coincidentally executes in the second processing core. A static offset 214 is introduced into T1 210 after execution of runnable $R_{1,1}$ 211 during every iteration of T1 210. Introducing the static offset 214 after execution of runnable $R_{1,1}$ 211 is permissible because T1 210 has three task runnables and four timesteps in which to complete its task, thus introducing the static offset 214 will not interfere with complete execution of T1 210. Thus, at timestep 1, T1 210 is delayed in executing in response to introduction of the static offset 214. Element $R_{4,1}$ 241 of T4 240 executes in the second processing core, which has lower priority than runnable $R_{3,1}$ 231 of T2 230. Introducing the static offset 214 after execution of runnable $R_{1,1}$ 211 is preferred because execution of runnable $R_{4,1}$ 241 of T4 240 is a required condition precedent thereto and runnable $R_{4,1}$ 241 of T4 240 executes in the second processing core at a lower priority than runnable $R_{3,1}$ 231 of T2 230. At timestep 2, runnable $R_{1,2}$ 212 of T1 210 executes in the first processing core after completed executions of the condition precedents of runnable $R_{1,1}$ 211 of T1 210 and runnable $R_{4,1}$ 241 of T4 240. At timestep 3, runnable $R_{3,1}$ 231 of T2 230 executes again in the second processing core in response to its scheduled execution that occurs every three timesteps. Element $R_{1,3}$ 213 of T1 210 executes in the first processing core, thus completing an iteration of T1 210. At timestep 4, another iteration of T1 210 executes in the first processing core in response to its scheduled execution that occurs every four timesteps. Thus, at timestep 4, runnable $R_{1,1}$ 211 of T1 210 executes. Simultaneously, runnable $R_{4,1}$ 241 of T4 240 executes in the second processing core because runnable $R_{3,1}$ 231 of T2 230 has previously executed and the second processing core is available to so execute. At timestep 5, T1 210 is delayed in executing in response to introduction of the static offset 214. This permits runnable $R_{2,2}$ 222 of T2 220 to execute in the first processing core at timestep 5, thus completing execution of T2 220 within the scheduled execution that is commanded every seven timesteps. Thus there is no delay in execution of T2 220, and no attendant delay in response times of systems awaiting the outcome of T2 220. At timestep 6, runnable $R_{1,2}$ 212 of T1 210 executes in the first processing core and runnable $R_{3,1}$ 231 of T2 230 executes again in the second processing core in response to its scheduled execution that occurs every three timesteps. At timestep 7, runnable $R_{1,3}$ 213 of T1 210 executes in the first processing core, thus completing another iteration of T1 210.

Introducing the static offset 214 after execution of runnable $R_{1,1}$ 211 frees a timestep in the first processing core during which lower priority T2 220 may execute its runnable. Thus, introducing the static offset 214 after execution of runnable $R_{1,1}$ 211 increases the likelihood that lower priority T2 220 executes its runnables in a timely manner without affecting response time of execution of T1 210. Furthermore, introducing the static offset 214 improves timing predictability of lower priority tasks, e.g., T2 220.

FIG. 3 graphically shows a sensitivity evaluation of set/wait events for a baseline utilization 315 and a maximum utilization 325, plotted in relation to internal combustion engine speed, shown on the x-axis 310. Utilization is shown on the y-axis 320. In order to evaluate the timing analysis using set/wait events, an example system with ten time-triggered tasks and two engine synchronous tasks was considered and evaluated. Relevant to the set/wait event mechanism are two pairs of tasks: (i) primary and secondary tasks with periods of 6.25 ms, and (ii) primary and secondary tasks with periods of 12.5 ms. Task pair (i) has 5 runnables while task pair (ii) has 68 runnables. Task pair (i) has 1 set/wait event structure, while task pair (ii) has 30 set/wait event structures. A timing analysis of this setup was executed on a dual-core system using the analysis. In the sensitivity evaluation, the execution times of tasks increase until the analysis computes that some task in the system just misses its deadline. The system utilization was noted at this load as the maximum achievable utilization for the given operating point. Given that there are two engine synchronous tasks, the engine speed was varied from 3500 RPM to 5750 RPM while measuring maximum achievable utilization. The results indicated that set/wait event structures affect utilization and the system is unable to exceed 52% utilization even when the baseline system has a high utilization. By contrast, if the system did not have such set/wait event structures but the same worst-case execution times, the system utilization can be increased by 127% at 3500 RPM and increased by 124% at 5750 RPM. This means that the system is schedulable at higher utilization thresholds. This has three implications: additional tasks can use the CPU processing power, or alternatively, a slower CPU can be employed, or alternatively, processors with fewer processing cores can be employed. Note that the utilization of a resource can never be higher than 100%. What is meant is that the current utilization at which the system is schedulable can be increased by, for instance, a factor of 1.27. If the current utilization is 60%, then an additional 7% (60%*1.27) of the processor utilization can be employed by up-integrating additional tasks. In other words, the system is still scheduled at 67% utilization. Other factors may affect utilization, including inherent delays introduced by set/wait event structures.

A spinlock primitive may be employed as a mechanism for run-time inter-core task synchronization in a multi-core operating system. A spinlock is a synchronization mechanism wherein a processing thread waits in a loop or spins while waiting to synchronize. The thread remains active but is not performing a useful task. Once acquired, a spinlock is held until released unless synchronization or another action releases the lock.

As described herein, runnables are required to acquire a spinlock before accessing any shared resource. If a resource is currently being used and the spinlock is being held, then the runnable requesting this resource continues to spin (nm) on the lock until it is released or until it is preempted by another higher priority runnable on the same core. However, a spinning runnable can be preempted. This acts as a dynamic run-time mechanism for mutual exclusion. A spinlock can be employed to improve system utilization by avoiding the overhead introduced by set/wait events. Shared logic resources can be protected across multiple processing cores using the spinlock primitive. Tasks accessing any mutually-exclusive shared resource may hold the spinlock before doing so. If a task tries to acquire a spinlock that is currently being held by some other task, the task spins or busy waits on the lock until it is released by the task. This mechanism thus provides support for realizing mutual exclusion of a shared resource in a multi-core processor.

In multi-core processor architectures, both spinlocks and set/wait events may be employed. For tasks where the mutual exclusion constraints need to be statically enforced, set/wait events are employed. For tasks where the mutual exclusion constraints can be dynamically enforced, spinlocks and/or a multi-processor priority ceiling protocol (MPCP) may be employed. For example, a system with multiple sensors and actuators, where the processing is handled on a dual-core processor is evaluated. The processing tasks themselves may use set/wait event constraints for statically defined mutual exclusion. The sensor and actuator data handling tasks might use run-time mutual exclusion primitives for ensuring consistent data readings. Although spinlocks successfully ensure mutual exclusion from a functional perspective, they may pose multiple problems from a timing perspective. Timing challenges associated with spinlocks include deadlocks, priority inversion, and starvation. A deadlock occurs when a task holding a lock is preempted by a higher-priority task which requires the same lock. In this case, the higher-priority task requesting the resource will be spinning or busy waiting forever. One solution to address this issue is to place design constraints that prevent tasks on the same processing core from using spinlocks.

A priority inversion occurs when a high-priority task waits for a low-priority task to release a resource. The use of spinlocks can lead to an unbounded duration of priority inversion, which presents a significant challenge to tasks with strict deadlines. In situations where there are many medium-priority tasks and multiple preemptions on a task, a high-priority task may end up facing an unbounded amount of priority inversion. Priority inversion is a more serious problem with spinlocks since the high-priority tasks are basically busy-waiting/wasting cycles on their processing cores. Long durations of priority inversion thus lead to significant loss in useful system utilization. Bounding such priority inversion is important to achieve both timing predictability and better utilization.

Starvation occurs when a task is starved from getting access to the shared resource. In one example, a spinlock is acquired and released back-and-forth between lower-priority tasks even though a higher-priority task is waiting on it. This sequence is possible when a hardware test-and-set implementation is not guaranteed to respect task priorities. When using spinlocks, starvation can arise because the hardware scheduling of test-and-set operations can be more favorable to certain processing cores, or the task spinning on the lock might be preempted on its processing core whenever the lock gets released by other tasks. As with the nature of spinlocks, the busy waiting during such starvation also leads to utilization loss from wasted processor cycles.

Task response-times with spinlocks can be determined for achieving bounded timing behavior that takes into consideration design constraints and assumptions. This includes using the analysis provided in EQS. 1, 2, and 3 by adding spinning time to account for the lock-waiting delays and a blocking time for the non-preemptive duration of lower-priority tasks. The blocking terms are calculated as follows. A lock-waiting delay is determined using the previously described set of design constraints. Each time a mutually exclusive task, i.e., a mutually exclusive event (mutex) M is requested by a Runnable $R_{i,j}$ of task Ti, the lock-waiting time using spinlocks is restricted to a lock-waiting delay of (I(M)−1)CM, wherein CM is the maximum lock-holding time. A cumulative spinning time CI(i,j) can be calculated for each task Ti. A mutex is a process that ensures that no two processes or processing threads access a shared logic resource, e.g., shared memory cache or location, during the same time period, thus preventing corruption of the shared resource. A non-preemptive duration is determined for each event which includes each periodically-triggered runnable $R_{i,j}$ of each task Ti. A non-preemptive duration Bn(i, j) of lower-priority tasks is bounded by using the maximum non-preemptive duration, which is determined as a maximum I(M)CM over all mutexes M that can be held by any task with lower priority than Ti. The lower-priority task is assumed to be non-preemptive over this entire duration. For runnables $R_{i,j}$ (j>1) that are triggered by the completion of previous runnable $R_{i,j}$ (j>1), the non-preemptive blocking duration Bn(i, j) is set as 0.

The spinning term CI(i,j) is added to the worst-case execution time of each runnable $R_{i,j}$ for all tasks (including the higher-priority tasks). The blocking term Bn(i,j) needs to only be applied for the task Ti, whose response time is calculated using EQ. 2. The aforementioned analysis described is thus extended to include the use of spinlocks.

Figure 4:
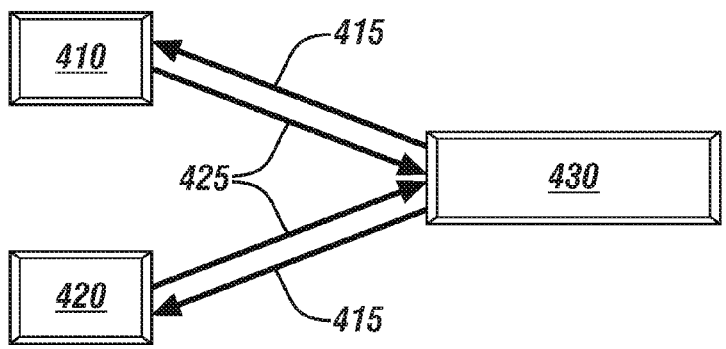
FIG. 4 schematically shows a process for analyzing timing of spinlocks, including first and second processing cores and shared software resource which is either acquired for execution or spinning, in accordance with the disclosure.

FIG. 4 schematically shows a process for analyzing timing of spinlocks, including first and second processing cores 410 and 420 respectively, and shared software resource 430 that is either acquired for execution 415 or spinning 425. This allows introduction of design constraints to enable a timing analysis and allows development of timing analysis with the design constraints in place.

Figure 5:
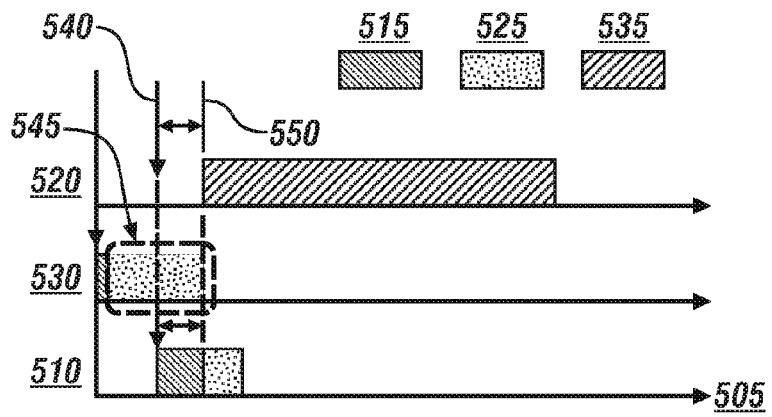
FIG. 5 graphically shows a timing graph associated with task execution employing spinlocks, shown in relationship to elapsed timesteps in accordance with the disclosure.

FIG. 5 graphically shows a timing graph associated with task execution employing spinlocks, shown in relationship to elapsed timesteps. Tasks are shown coincidentally in relation to elapsed time on the x-axis 505, and include Task T1 510 attempting to execute on a second processing core, Task T2 520 attempting to execute on a first processing core, and Task T3 530 attempting to execute on the first processing core. Initially, T3 530 is in a busy/waiting mode 515 with a lock-held state 525 employing a suspend-all-interrupt function 545. At timestep 540, T1 510 enters a busy/waiting mode 515, which changes to the lock-held state at timestep 550 and employs remote blocking. T2 520 begins operating in a pre-emptive blocking mode 535 at timestep 550. Thus, to bound busy-waiting periods, the control system employs a suspend-all-interrupt function before acquiring any spinlock, thus enabling interrupts only after releasing the spinlock. Successive requests to any spinlock M are spaced out in time by I(M)CM, wherein I(M) is a quantity of tasks accessing the spinlock M and CM is the maximum duration for which M is held, i.e., lock-holding time.

Figure 6:
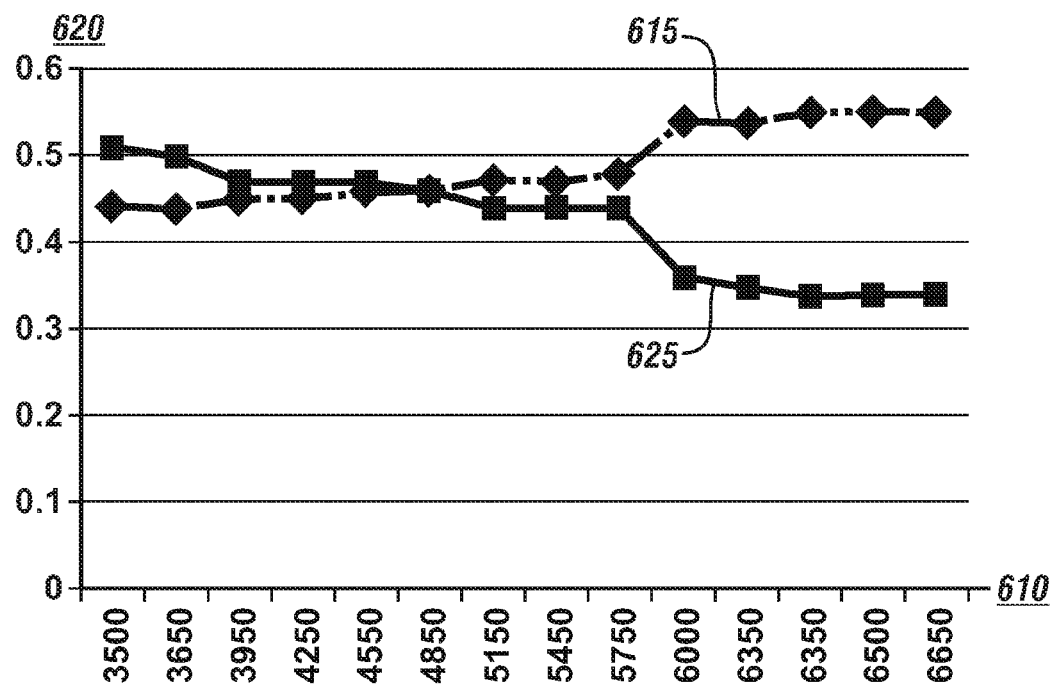
FIG. 6 graphically shows a sensitivity evaluation of spinlocks for a baseline utilization and a maximum utilization, plotted in relation to internal combustion engine speed in accordance with the disclosure.

FIG. 6 graphically shows a sensitivity evaluation of spinlocks for a baseline utilization 615 and a maximum utilization 625, plotted in relation to engine speed, shown on the x-axis 610. Utilization is shown on the y-axis 620. In this case global logic resources to be shared across the dual-core processor are introduced. A minimum of 2 tasks per resource and a maximum of 3 tasks per resource were employed, with no more than 2 resources per task. The percentage of time spent by each task was increased on each of its global critical sections until the system was determined analytically to just miss its deadline. The set/wait event structures were ignored. As can be seen in these results, the system performs quite well allowing each task to spend up to 50% of its execution time on globally shared resources.

Placing a restrictive set of design constraints can lead to bounded response times with spinlocks. However, the spinlock mechanism still does not ensure a priority-ordered service of resource requests. In order to relax the assumptions and ensure a priority-driven service, a multi-processor priority ceiling protocol (MPCP) may be employed. The MPCP is employed for task synchronization in a multi-core processor to achieve a priority-ordered service of resource requests by relaxing assumptions. Terms of interest include a global mutex $M_G$, which is a mutex shared by tasks deployed on different processing cores. The corresponding critical sections are referred to as global critical sections (GCS). Conversely, a local mutex is only shared between tasks on the same processing core, and the corresponding critical sections are local critical sections. When a task T acquires $M_G$, it executes the GCS corresponding to the global mutex $M_G$ at a priority that is set as follows:

$$p(M_G)=p(G)+p(T0)$$

wherein
$p(M_G)$ is a priority ceiling,
$p(G)$ is a base priority level greater than that of any other normally executing task in the system, and
$p(T0)$ is the priority of a highest priority task T0 that can lock the global mutex $M_G$.

Each MPCP minimizes remote blocking and priority inversions when global resources are shared. Each MPCP includes the following characteristics, including tasks use assigned priorities unless within critical sections, and a single processor priority ceiling protocol is used for all requests to local mutexes. A task within a global critical section (GCS) guarded by global mutex $M_G$ has the priority of its GCS, i.e., $(p(G)+p(T0))$. A task within a GCS can preempt another task T* within a GCS if the priority of the GCS for T0 is greater than the priority of the GCS for T*. When a task T requests a global mutex $M_G$, the global mutex $M_G$ can be granted to T by means of an atomic transaction on shared memory if $M_G$ is not held by another task. If a request for a global mutex $M_G$ cannot be granted, the task T is added to a prioritized queue on $M_G$ before being preempted. The priority used as the key for queue insertion is the normal priority assigned to T. When a task T attempts to release a global mutex $M_G$, the highest priority task Th waiting for $M_G$ is signaled and becomes eligible for execution at Th's host processing core at its GCS priority. If no tasks are suspended on global mutex $M_G$, it is released.

Figure 7:
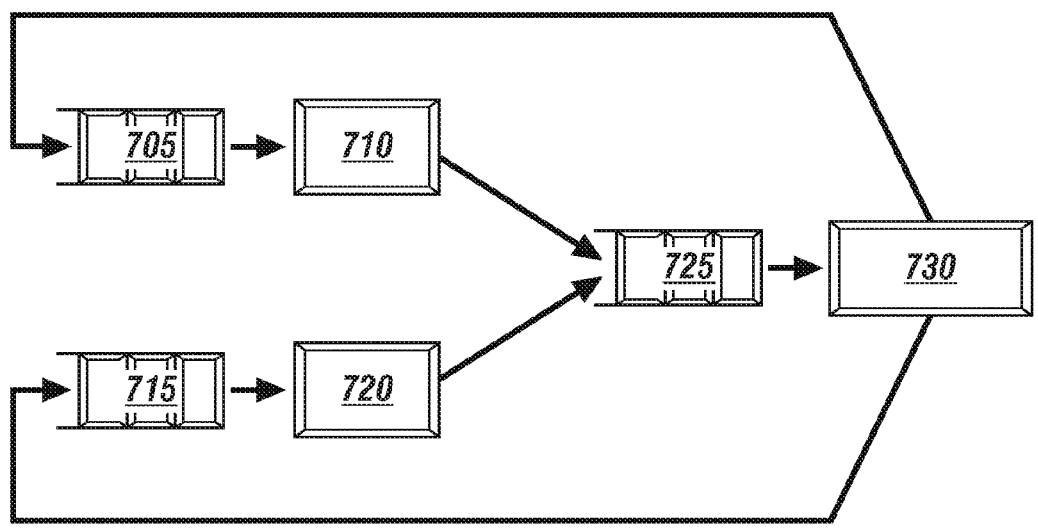
FIG. 7 schematically shows implementation of a multiprocessor priority ceiling protocol, including first and second processing cores and corresponding first and second priority queues leading to a shared priority queue that is executed by a shared software resource in accordance with the disclosure.

FIG. 7 schematically shows implementation of a multi-processor priority ceiling protocol, including first and second processing cores 710 and 720, respectively, having corresponding first and second priority queues 705 and 715 respectively, which leads to a shared priority queue 725 that is executed by a shared software resource 730. Each global mutex maintains a priority queue of tasks waiting to acquire it. When a task acquires the global mutex, it is ready to execute on its corresponding processing core at the remote priority ceiling of the global mutex. Priority is established as a maximum of all task normal execution priorities and a maximum of all normal priorities of tasks accessing the shared software resource, which is described herein.

Figure 8:
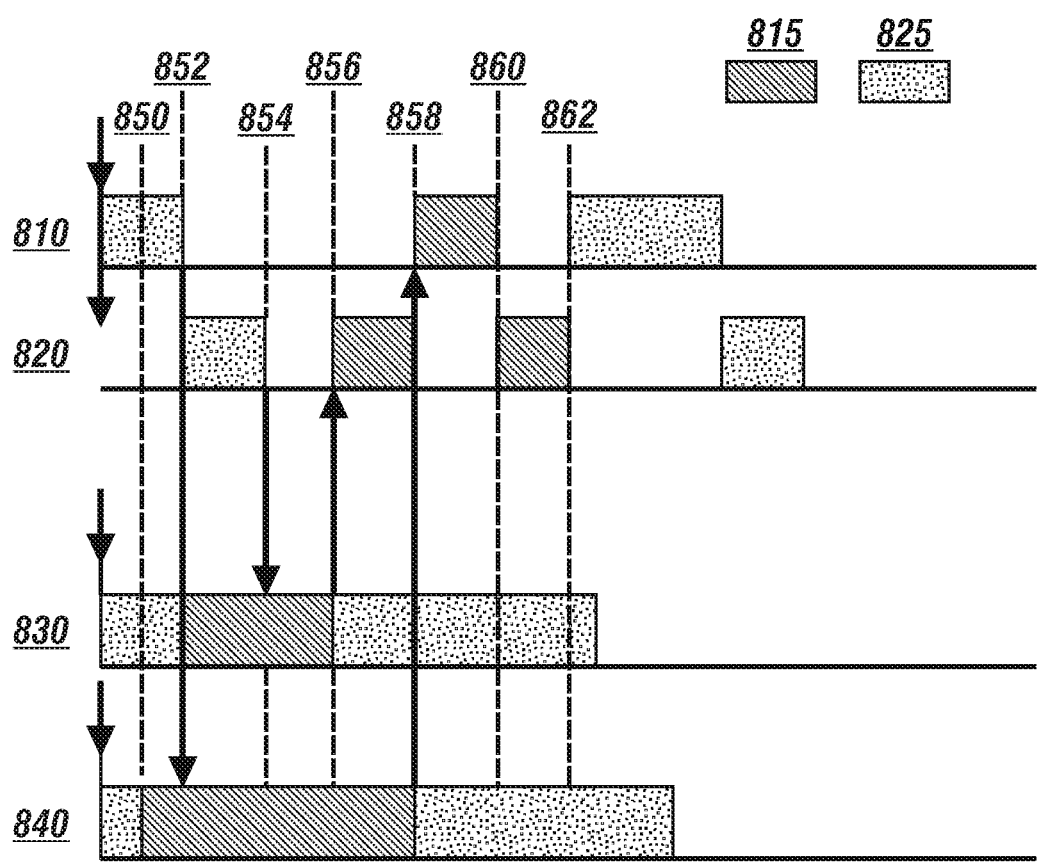
FIG. 8 graphically shows a timing graph associated with execution of the multi-processor priority ceiling protocol in accordance with the disclosure.

FIG. 8 graphically shows a timing graph associated with execution of the multi-processor priority ceiling protocol. There are four tasks in this system, including T1 810, T2 820, T3 830, and T4 840. Tasks T1 810 and T2 820 are assigned to the same processing core P1. Task T3 830 is assigned to a second processing core P2. Task T4 840 is assigned to a third processing core P3. Tasks T1 810 and T4 840 share a logic resource using a first global mutex M1. Tasks T2 820 and T3 830 share a different logic resource using a second global mutex M2. Each of the tasks T1 810, T2 820, T3 830, and T4 840 includes normal execution 825 and critical execution 815, with critical execution 825 corresponding to tasks that have high priority. Initially, tasks T1 810, T2 820, and T4 840 are in normal execution 825. At timestep 850, T4 840 begins critical execution 815. At timestep 852, T3 830 begins critical execution 815, and T2 820 begins normal execution 825, which ends at timestep 854. T2 820 requests the global mutex M2, which it acquires when the second global mutex M2 is released by T3 830 at timestep 856, thus allowing T2 to execute with critical execution 815. When T2 820 completes executing at the remote priority ceiling of second global mutex M2, the first global mutex M1 with higher remote priority ceiling is released by T4 840 at timestep 858 and priority is given to T1 810. This causes a preemption of T2 820 by T1 810, even though T2 820 is holding second global mutex M2, since the first global mutex M1 has a higher remote priority ceiling than the second global mutex M2. At timestep 860, T1 810 completes the critical execution 815, which allows T2 820 to operate with critical execution 815, ending at timestep 862. The multi-processor priority ceiling protocol thus allows tasks holding global mutexes to be preempted by higher-priority global mutexes, which is beneficial in reducing the lock-waiting delays and lock-holding times of global mutexes accessed by high-priority tasks.

A benefit of using the multi-processor priority ceiling protocol includes permitting priority-driven access to shared resources, wherein each global mutex has a priority queue of tasks suspended on it. When the resource is released, it is given to the highest priority task waiting on it. This property is not provided by spinlocks, which allows the hardware test-and-set primitives to determine the task that gets the resource. Another benefit of using the multi-processor priority ceiling protocol includes a restricted preemption of tasks that are holding locks. Under MPCP, a global priority ceiling p(G) is employed that allows for tasks holding mutexes to be preempted by mutexes with a higher remote priority ceiling, wherein p(M_G) represents the remote priority ceiling. This ensures the responsiveness of highest priority tasks that may have short deadlines.

Another benefit of using the multi-processor priority ceiling protocol includes no cycles wasted in a busy waiting mode, including in a suspension-based implementation of MPCP where tasks are allowed to suspend when the requested lock is not available. The task is added to a priority queue on the mutex and it is notified when the resource is granted. This avoids any cycles wasted in busy waiting. However, the task suspension itself introduces the possibility of lower-priority tasks executing and requesting global mutexes. This may lead to preemptions from such tasks at a later point of execution. In order to avoid such a penalty, a spin-based implementation of MPCP can be employed where tasks spin on the requested lock until it is available.

The aforementioned response-time test for tasks with set/wait events can be readily extended to handle synchronization with MPCP. Blocking terms are defined for a global-mutex-waiting delay, and a lower-priority global-mutex-holding duration. The global-mutex-waiting delays are described as follows. The tasks acquire global mutexes in priority order with the MPCP. The mutex can thus be viewed as a resource scheduled in a fixed-priority order. Blocking time $BM_{i,j}$ of a runnable $R_{i,j}$ of task Ti accessing a global mutex M is defined as follows.

$$B_{i,j}^{M,q+1} = \max_{Tl \in lp(Tl) \text{ and } Tl \in M} 1 * W_l^M + \sum_{Th \in hp(Tl) \text{ and } Th \in M} \left(\frac{B_{i,j}^{M,q}}{Th} + 1\right) * W_h^{\prime M} \quad [4]$$

wherein $$B_{i,j}^{M,0} = \max_{Tl \in lp(Tl) \text{ and } Tl \in M} 1 * W_l^{\prime M}$$

The first term corresponds to the maximum duration for which the mutex M can be held by any lower-priority task Tl when Ti requests M. The second term represents the maximum duration for which higher-priority tasks Th can hold the mutex M before task Ti can acquire M. Here, $W_l^{\prime M}$ is the maximum global-mutex-holding time of task Tl with respect to global mutex M. Under MPCP, tasks holding the global mutex M can still be preempted by tasks holding mutexes with higher remote priority ceiling. The maximum global-mutex-holding time of task Tl is thus given by the convergence as follows.

$$W_l^M = CM + \sum_{\forall Tk || P(Tk) = P(Ti)} \max_{\forall M' || Tk \in M' \text{ and } p(M') > p(M)} CM' \quad [5]$$

In EQ. 5, the first term CM represents the worst-case execution time when holding the global mutex M. The second term represents the maximum preemption possible when Ti is holding the global mutex M by tasks Tk on the same processing core as Ti when they acquire mutexes M' with higher remote priority ceilings than the global mutex M.

The total global-mutex-waiting delay $B_{i,j}$ for runnable $R_{i,j}$ is determined by summing the blocking times $BM_{i,j}$ for each access from $T_{i,j}$ over all mutexes M. Bi is represented as the sum of waiting delays $B_{i,j}$ over all runnables $R_{i,j}$ belonging to task Ti.

A lower-priority global-mutex-holding duration is determined as follows. Whenever a task Tl with lower priority than Ti acquires a global mutex M, its priority gets promoted to the remote priority ceiling of M. This remote priority ceiling is defined to be above all normal execution priorities and hence causes a preemption of Ti even if Ti is not holding any locks. This preemption from the lower-priority global-mutex-holding duration can be accommodated by the blocking term $H_{i,j}$ for each runnable $R_{i,j}$. If $R_{i,j}$ is triggered externally and it acquires $\rho_{i,j}$ global mutexes during execution, as follows.

$$H_{i,j}(\rho_{i,j}+1) \sum_{\forall Tk\|P(Tk)=P(Ti) \text{ and } Tk \in lp(Ti)} \max_{\forall M'\|Tk \in M'} CM' \quad [6]$$

If $R_{i,j}$ (with j>1) is triggered by the completion of $R_{i,j-1}$ and it acquires $\rho_{i,j}$ global mutexes during execution, then:

$$H_{i,j}(\rho_{i,j}) \sum_{\forall Tk\|P(Tk)=P(Ti) \text{ and } Tk \in lp(Ti)} \max_{\forall M'\|Tk \in M'} CM' \quad [7]$$

The total lower-priority global-mutex-holding duration Hi experienced by task Ti can be calculated by summing up the $H_{i,j}$ over all runnables $R_{i,j}$ belonging to task Ti.

The worst-case response-time convergence given in EQ. 2 can be modified as follows.

$$W^{v+1}_{i,\{e \ldots j\}} = \sum_{q=e}^{j}(C_{i,q}+B_{i,q}+H_{i,q}) + \sum_{\forall Th\|hp(Ti) \text{ and } P(Th)=P(Ti)} \left\lceil \frac{W^{v+1}_{i,\{e \ldots j\}}+Bh}{Th} \right\rceil * Ch \quad [8]$$

The analysis thus includes mutual exclusion using the Multi-processor Priority Ceiling Protocol (MPCP). In addition to providing priority-driven service and bounded timing properties, the use of MPCP eliminates the constraints and assumptions required for spinlocks.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for managing task execution in a multi-core processor, comprising:
   employing a spinlock to effect a dynamically enforceable mutual exclusion constraint; and
   employing a multi-processor priority ceiling protocol to effect the dynamically enforceable mutual exclusion constraint to synchronize a plurality of tasks executing in the first and second processing cores of the multi-core processor;
      wherein employing the multi-processor priority ceiling protocol comprises employing a global priority ceiling to preempt tasks having selected mutual exclusion constraints by a task having a mutual exclusion constraint having a higher remote priority ceiling, including executing global critical sections corresponding to a global mutex $M_G$ when a task T acquires the global mutex $M_G$ at a set priority.

2. The method of claim 1, wherein employing a global priority ceiling to preempt tasks having selected mutual exclusion constraints by a task having a mutual exclusion constraint having a higher remote priority ceiling including executing global critical sections corresponding to a global mutex $M_G$ when a task T acquires the global mutex $M_G$ at a set priority further comprises the set priority being set in accordance with the following relationship:

$$p(M_G)=p(G)+p(T0)$$

wherein $p(M_G)$ is a priority ceiling for the global mutex $M_G$,
   p(G) is a base priority level greater than another executing task in the system, and
   p(T0) is the priority of a highest priority task T0 that can lock the global mutex $M_G$.

3. The method of claim 2, wherein the global mutex $M_G$ is a mutex shared by tasks deployed in different ones of the first and second processing cores of the multi-core processor.

4. A method for managing task execution in a multi-core processor, comprising:
   executing a runnable of a task in a first processing core of the multi-core processor including introducing a static offset for another runnable of a task executing in a second processing core of the multi-core processor to effect a statically defined mutual exclusion constraint across said runnables;
   employing a spinlock to effect a dynamically enforceable mutual exclusion constraint and employing a multi-processor priority ceiling protocol to effect the dynamically enforceable mutual exclusion constraint to synchronize a plurality of tasks executing in the first and second processing cores of the multi-core processor;
      wherein employing the multi-processor priority ceiling protocol comprises employing a global priority ceiling to preempt tasks having selected mutual exclusion constraints by a task having a mutual exclusion constraint having a higher remote priority ceiling, including executing global critical sections corresponding to a global mutex when a task acquires the global mutex at a set priority.

5. A method for managing task execution in a multi-core processor, comprising:
   executing a runnable of a task in a first processing core including introducing a static offset for another runnable of a task executing in a second processing core to effect a statically defined mutual exclusion constraint across said runnables; and
   selectively employing spinlocks, set/wait events, and multi-processor priority ceiling protocols to effect mutual exclusion constraints to synchronize a plurality of tasks executing in the first and second processing cores;
      wherein employing multi-processor priority ceiling protocols comprises employing a global priority ceiling to preempt tasks having selected mutual exclusion constraints by a task having a mutual exclusion constraint with a higher priority ceiling, including executing global critical sections corresponding to a global mutex $M_G$ when a task T acquires the global mutex $M_G$ at a set priority.

6. The method of claim 5, wherein employing set/wait events statically enforce the mutual exclusion constraints.

7. The method of claim 5, wherein employing spinlocks and the multi-processor priority ceiling protocols dynamically enforce the mutual exclusion constraints.

8. The method of claim 5, wherein employing the global priority ceiling to preempt tasks having selected mutual exclusion constraints by a task having a mutual exclusion constraint with a higher priority ceiling, including executing global critical sections corresponding to a global mutex $M_G$ when a task T acquires the global mutex $M_G$ at a set priority further comprises the set priority being set in accordance with the following relationship:

$$p(M_G)=p(G)+p(T0)$$

wherein p($M_G$) is a priority ceiling for the global mutex $M_G$,
p(G) is a base priority level greater than another executing task in the system, and
p(T0) is the priority of a highest priority task T0 that can lock the global mutex $M_G$.

9. The method of claim 8, wherein the global mutex $M_G$ is a mutex shared by tasks deployed in each of the first and second processing cores of the multi-core processor.

10. The method of claim 5, wherein employing the multi-processor priority ceiling protocols comprises assigning priority to a task within a global critical section guarded by a global mutex with a priority of the global critical section.

11. The method of claim 10, wherein employing the multi-processor priority ceiling protocols further comprises permitting a first task within the global critical section to preempt a second task within the global critical section when a priority of the first task is greater than a priority of the second task.

12. The method of claim 11, wherein employing the multi-processor priority ceiling protocols further comprises granting a global mutex to a task using an atomic transaction in shared memory of the multi-core processor when the global mutex is not held by another task.

13. The method of claim 12, wherein employing the multi-processor priority ceiling protocols further comprises adding a task to a prioritized queue on the global mutex before preempting the task when a request for a global mutex cannot be granted, wherein a priority for the task added to the prioritized queue is pre-assigned.

14. The method of claim 13, wherein employing the multi-processor priority ceiling protocols further comprises making a highest priority task eligible for execution in a host processing core for the highest priority task at the global critical section priority for the highest priority task when a task attempts to release the global mutex.

15. The method of claim 14, wherein employing the multi-processor priority ceiling protocols further comprises pre-assigning priorities to tasks outside global critical sections.

16. The method of claim 15, wherein employing the multi-processor priority ceiling protocols further comprises employing a single processor priority ceiling protocol for a request to a local mutex.

* * * * *